United States Patent [19]
Grosser et al.

[11] Patent Number: 5,237,352
[45] Date of Patent: Aug. 17, 1993

[54] APPARATUS FOR SOUNDPROOFING MOVING PICTURE CAMERAS

[75] Inventors: Claus Grosser, Freising; Hans D. Jacoby, Vaterstetten; Hanns Köhler, München, all of Fed. Rep. of Germany

[73] Assignee: Arnold & Richter Cine Technik, GmbH & Co., Betriebs KG, Muünchen, Fed. Rep. of Germany

[21] Appl. No.: 754,919

[22] Filed: Sep. 6, 1991

[30] Foreign Application Priority Data

Sep. 6, 1990 [DE] Fed. Rep. of Germany ....... 4028540

[51] Int. Cl.⁵ ............................................. G03B 31/00
[52] U.S. Cl. ........................................ 352/35; 359/820
[58] Field of Search ................. 352/35, 131; 354/65; 359/820

[56] References Cited

U.S. PATENT DOCUMENTS

| | | | |
|---|---|---|---|
| 1,325,936 | 12/1919 | Fouasse | 359/820 |
| 1,667,724 | 5/1928 | De Vry | 352/35 |
| 2,423,492 | 7/1947 | Fairbank | 359/820 |
| 2,533,478 | 12/1950 | Lee et al. | 359/820 |
| 3,205,774 | 9/1965 | Estes | 359/820 |
| 4,174,157 | 11/1979 | Gottschalk | 352/35 |
| 4,536,066 | 8/1985 | Bauer | 352/35 |
| 5,037,195 | 8/1991 | Clairmont et al. | 352/35 |
| 5,067,808 | 11/1991 | Alscher | 359/820 |

Primary Examiner—Monroe H. Hayes
Attorney, Agent, or Firm—Nils H. Ljungman & Associates

[57] ABSTRACT

Apparatus for the soundproofing of moving picture cameras with a soundproof mounting of the camera skeleton supporting the parts of the camera mechanism which generate noise and vibrations in a camera housing, which has a lens holder, to which interchangeable lenses can be fastened, whereby for the soundproof mounting of the camera skeleton in the camera housing, there are several soundproofing connecting elements between the camera skeleton and the camera housing, at least some of which have a directional natural rigidity.

8 Claims, 4 Drawing Sheets

APPARATUS FOR SOUNDPROOFING MOVING PICTURE CAMERAS

1. FIELD OF THE INVENTION

This invention relates to an apparatus for the soundproofing of moving picture cameras. A camera skeleton supports the parts of the camera mechanism which generate noise, and a camera housing has a lens mount, to which interchangeable lenses can be fastened. In the camera housing there is a soundproofing mounting of the camera skeleton, whereby for the soundproof mounting of the camera skeleton in the camera housing there are several soundproofing connecting elements between the camera skeleton and the camera housing.

2. BACKGROUND INFORMATION

To transport a moving picture film, moving picture cameras have motor and transmission devices, as well as a moving diaphragm device, by means of which the light path is interrupted during the film transport from the lens to the focal plane. These moving devices generate mechanical vibrations which cannot be eliminated in the camera itself. To keep the inherent noise level of such a moving picture camera to a minimum, it is necessary to prevent the transmission of these unavoidable vibrations to the external skin of the film camera.

For soundproofing, damping materials such as rubber and similar materials are used between the moving parts of the moving picture camera and the camera housing, but they have the disadvantage of low mechanical stability, so that a frequent readjustment is necessary, since the camera lens is fastened to the camera housing, while the focal plane of the moving picture film runs in the vicinity of the moving parts of the film camera, so that any displacement between the camera housing and the camera skeleton supporting the moving parts of the moving picture camera causes a loss of sharpness of the image or image shifts. The prior art has proposed various measures to solve this problem.

Federal Republic of Germany Patent Publication DE 30 49 150 C2 discloses a moving picture camera which consists of an inner camera and an external camera housing. The inner camera includes an image aperture, a film transport mechanism, a ground glass disc or screen, a rotating reflecting diaphragm, an apparatus for the transport of the moving picture film from a film feeding spool roll to a film take-up spool, as well as a film magazine and a motor/transmission unit to drive all the moving parts of the camera.

A changeable shooting lens is fastened to the external camera housing by means of a lens mount. The internal camera is supported on the external camera housing by components which make it possible to change the position of the inner camera in relation to the external camera housing when the position of the moving picture camera changes.

To compensate for these allowable changes in position of the internal camera in relation to the external camera housing, there is an apparatus which, when there are such changes in the position of the camera, move the inner camera relative to the external camera housing back into a specified ideal position, in which the required sharpness of the image is guaranteed. This return apparatus consists of a two-armed lever, which is mounted in a fulcrum point in a connector connected to the external camera housing, while the one lever arm is rotatably fastened to the inner camera, and the other lever arm can be activated to change the position of the inner camera.

This device of the prior art naturally reacts to compensate for movements of the moving picture camera, but it cannot prevent short-term shifts of the flange focal distance between the lens plane fastened to the external camera housing and the focal plane fastened to the inner camera or to the camera skeleton. Moreover, the compensation apparatus is relatively complex and expensive, and takes up additional space in the moving picture camera.

U.S. Pat. No. 4,174,157 discloses a moving picture camera which is composed of an inner camera and an external camera housing, whereby the moving parts of the camera are fastened to the inner camera, while the external camera housing has a lens mount. Between the inner camera and the external camera housing, there are soundproof connecting elements, which have an externally threaded rod which can be screwed into the camera housing or into the inner camera. The externally threaded rod is held in an internally threaded sleeve, between which and an externally threaded bearing bush there is a hollow cylindrical elastomer insert.

The externally threaded rod, the internally threaded sleeve, the elastomer insert and the externally threaded bearing bush are oriented coaxially to one another, whereby the externally threaded bearing bush is held by an internally threaded element on the other part of the camera housing or the inner camera. If, after the loosening of the externally threaded rod, the externally threaded bearing bush rotates inside the internally threaded sleeve, it becomes possible to adjust the lateral orientation of the inner camera and the movable camera parts in relation to the camera housing, and thus the lens mount.

On this apparatus of the prior art for soundproofing the inner camera in relation to the external camera housing, a constant readjustment of the soundproofing connecting elements is necessary to guarantee the specified flange focal distance between the lens plane and the focal plane.

OBJECT OF THE INVENTION

The object of the present invention is to create an apparatus for soundproofing moving picture cameras, which guarantees on one hand a maximum soundproofing and on the other hand the maintenance of the specified flange focal distance between the lens plane and the focal plane without readjustment or additional compensation equipment.

SUMMARY OF THE INVENTION

The solution according to the invention creates an optimal soundproofing between the camera skeleton and the camera housing, with a simultaneous determination of the flange focal distance between the lens plane and the focal plane, without the need for readjustments or compensation equipment to maintain the flange focal distance.

The solution according to the invention is based on the knowledge that when the soundproofing connecting elements located between the camera skeleton and the camera housing are too rigid, i.e. when the connecting elements are too hard, the damping characteristics of these connecting elements are poor, so that the soundproofing does not meet the requirements, while when the natural rigidity of the soundproofing connecting elements is too low, i.e. when very soft connecting elements are used, the flange focal distance between the lens plane and the focal plane cannot be maintained because of vibration, so that the image becomes less sharp, or readjustments and compensation equipment are necessary to maintain the desired image quality.

If, on the other hand, soundproofing connecting elements with directional natural rigidity characteristics are used, then on one hand the "soft" suspension of the camera skeleton in the camera housing necessary for soundproofing, and on the other hand the "hard" rigidity characteristics of the connecting elements in the plane perpendicular to the flange focal distance necessary to maintain the flange focal distance can be maintained.

One advantageous refinement of the solution according to the invention is characterized by the fact that the connecting elements having a directional natural rigidity have a high, rigidly defined and temperature-compensated rigidity in the direction of the flange focal distance between the lens plane of the camera housing and the focal plane of the camera skeleton, and a low rigidity in the plane perpendicular to it.

The additional use of soundproofing connecting elements with temperature compensated natural rigidity in the direction of the flange focal distance guarantees the maintenance of the flange focal distance even in the event of temperature fluctuations, so that even if rather severe temperature changes occur, no readjustment of the connecting elements between the camera skeleton and camera housing is necessary to maintain the required sharpness of the image.

An additional advantageous refinement of the solution according to the invention is characterized by the fact that the connecting elements having a directional natural rigidity are located between the front side of the camera skeleton and the front side of the camera housing, and that there is at least one additional connecting element between the back side of the camera skeleton and the back side of the camera housing, which with its high elasticity exerts a high pretension force between the camera skeleton and the camera housing.

With this refinement of the solution according to the invention, the camera skeleton can be suspended directly in the camera housing on specified support points, while at an additional point between the camera skeleton and the camera housing, it can be moved with a high initial tension into the specified position. This arrangement achieves the goal of executing the suspension of the camera skeleton in the camera housing in a direction, namely in the direction of the flange focal distance, in a manner which is particularly hard and temperature compensated, while it is suspended very softly in the other directions and thus guarantees optimal soundproofing.

One advantageous configuration of the solution according to the invention is characterized by the fact that the front-side connecting elements are fastened on one hand to the top and bottom side of the camera housing, and on the other hand to the front plate of the camera skeleton, and exert a specified, high rigidity toward the front plate of the camera skeleton.

The suspension of the camera skeleton by means of directional connecting elements in the vicinity of the front side of the camera directly guarantees the effect of the directional natural rigidity of the connecting elements where they are required, namely in the area between the focal plane and the lens plane, while the "soft" characteristics of the connecting elements necessary for soundproofing are provided in the plane perpendicular to the above plane, and thus the number of connecting elements is reduced to a minimum, so that there can be no additional transmission of structurally borne noise from the camera skeleton to the camera housing, and all that needs to be insulated in these areas is the air borne noise.

An additional advantageous configuration of the solution according to the invention is characterized by the fact that the connecting elements having a directional natural rigidity are fastened to points of the camera housing which have a high structural rigidity, in particular in the vicinity of corners or edges of the camera housing.

This configuration of the solution according to the invention makes do with the lowest possible number of soundproofing connecting elements transmitting structurally borne noise, and in particular uses them where the unavoidable transmissions of structurally borne noise also have the least possible effect. This is the case in particular where no deformations on the camera housing can occur on account of structurally borne noise, i.e. at points of high input impedance or structural rigidity, such as corners or edges of the camera housing.

At these points, only small housing deformations can occur on account of the structure of the housing, so that consequently only small housing vibrations can occur, which are caused by the transmission of structurally borne noise by the connecting elements from the camera skeleton to the camera housing.

One advantageous refinement of the solution according to the invention is characterized by the fact that the connecting elements having a directional natural rigidity contain an essentially hollow cylindrical vibration damper, and inner sleeve mounted in the damper housing and a damper rod in contact with one end surface of the inner sleeve and soundproofed from the cylinder wall of the inner sleeve by means of an insulation sleeve, whereby the inner sleeve is made of aluminum and is braced on the steel end surface of the damper housing facing the camera skeleton, that the camera housing is made of steel and is braced on the end surface of the inner sleeve facing the bottom of the damper housing with one end, and with the other end is braced against a bearing connected to the camera skeleton.

This configuration of a vibration damper with temperature-compensated characteristics guarantees that thermal expansions of the individual elements of the vibration damper are compensated on account of the different thermal expansion characteristics, so that overall a fixed flange focal distance is guaranteed. It is thereby guaranteed that even in the event of severe temperature changes, to which moving picture cameras are frequently exposed, no readjustment is necessary and the necessary constant flange focal distance is guaranteed. At the same time, on account of the inclusion of an insulation sleeve, the transmission of structurally borne noise from the camera skeleton to the camera housing is greatly damped, so that the vibration damper also makes a significant contribution to the overall damping of the transmission of structurally borne noise.

An additional advantageous configuration of the solution according to the invention is characterized by the fact that the damper housing has a worm drive, which in connection with a worm gear makes possible the precision adjustment of the camera skeleton in relation to the lens holder, and has a pivot-shaped part for a rough adjustment.

The configuration of the vibration damper is sized so that a rough preliminary adjustment of the camera skeleton in relation to the camera housing can be made, followed by a precision adjustment by means of an easily accessible worm drive, so that a precise adjustment of the focal plane can be made in relation to the lens plane. Any readjustments which may subsequently be necessary can therefore be made easily, without having to dismantle parts of the camera.

An additional advantageous configuration of the solution according to the invention is characterized by the fact that the connecting elements having a directional natural rigidity have a bearing housing connected to the camera housing, and that the bearing housing contains cylindrical holes, which are oriented toward the front side of the camera skeleton and are used to hold buffer elements and vibration dampers, whereby the buffer elements consist of hollow cylindrical rubber buffers, which are connected to the front side of the camera skeleton by means of a screw element and a bushing inserted through the inner hole of the rubber buffer.

The composition of the connecting elements with directional natural rigidity of buffer elements and vibration dampers takes effective advantage of the different rigidities of the connecting elements in the direction of the flange focal distance or in the direction perpendicular to it.

An additional advantageous configuration of the solution according to the invention is characterized by the fact that the bearing bush consists of an external steel ring, a special rubber ring located in the steel ring, and a plexiglass ring inside the special rubber ring.

The bearing bushes, as the counter-bearings to the damper rods, also have damping characteristics, because there is a special rubber ring between the steel rings, so that in addition to a high precision, an additional damping characteristic is guaranteed by the bearing bushes, even in the event of severe vibrations.

One aspect of the invention resides broadly in a moving picture camera, comprising a camera housing; a lens mounting for mounting a lens on said camera housing, said lens mounting being attached to said camera housing; a camera skeleton for supporting moving mechanical parts of the camera mechanism which generate sound and mechanical vibration; and a plurality of mounting elements for mounting said camera skeleton in said camera housing, at least a portion of said plurality of mounting elements for preventing sound generated by the moving mechanical parts of the camera mechanism from being transmitted to said camera body, and at least a portion of said plurality of mounting elements being rigid in one direction for reducing mechanical vibration between the camera skeleton and the camera body, each of said plurality of directionally rigid mounting elements being more rigid in one direction than in another direction of said directionally rigid mounting elements.

BRIEF DESCRIPTION OF THE DRAWINGS

The invention is explained in greater detail below on the basis of the embodiments illustrated in the accompanying drawings.

DESCRIPTION OF THE PREFERRED EMBODIMENTS

Figure 1:
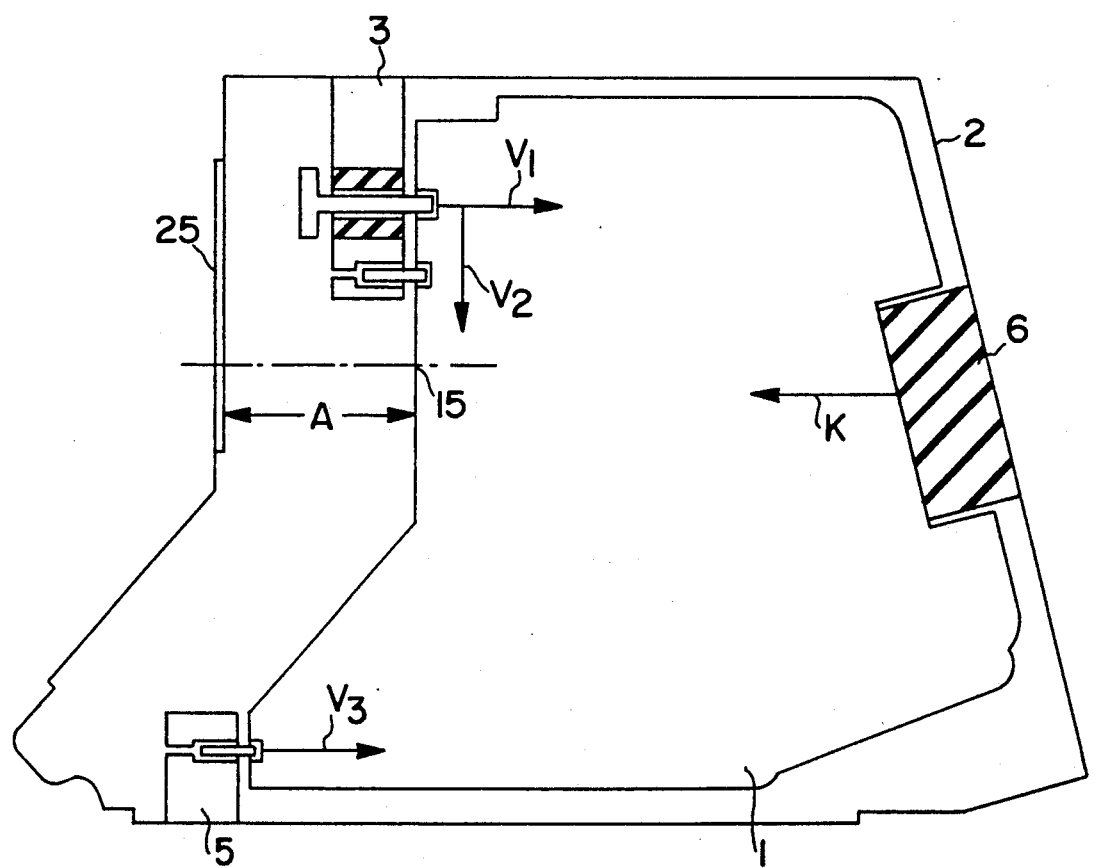
FIG. 1 schematic diagram of a moving picture camera with camera skeleton and camera housing, as well as soundproofing connecting elements located between them.

The schematic diagram in FIG. 1 shows a moving picture camera with a camera skeleton 1, which supports all the moving parts of the moving picture camera, such as the claw feed system, the winding and rewinding devices, the reflecting diaphragm etc., all of which are elements which produce noise and vibrations.

The camera skeleton 1 is surrounded by a camera housing 2 which is intended to block the noises produced in the camera skeleton 1 from the environment of the moving picture camera. This shielding is accomplished on one hand by suitable measures which damp the air borne noise between the camera skeleton 1 and the camera housing 2, and on the other hand, in accordance with the object of the present invention, by connecting elements 3, 5, 6 which suspend the camera skeleton 1 in the camera housing 2, and are simultaneously designed so that they provide optimal damping of the structurally borne noise.

In addition, the arrangement and characteristics of the connecting elements 3, 5, 6 should be designed so that the specified flange focal distance A is precisely maintained between the lens plane 25 and the focal plane 15, since any shift of the flange focal distance A results in a loss in sharpness of the image and a slow drift of the image position.

These contradictory requirements for the connecting elements 3, 5, 6 could be solved by means of a compromise, in which the connecting elements used have a sufficient soundproofing action, but simultaneously guarantee a sufficiently stable flange focal distance. But that would mean that to set a precise flange focal distance A, constant readjustment would be necessary, or there would have to be corresponding compensation equipment as described above. At the same time, however, with such a compromise it would be necessary to put up with a certain amount of structurally borne noise transmission, so that the noise isolation achieved would not be optimal.

According to the invention, at least the soundproofing connecting element 3 has a directional natural rigidity, which has a high natural rigidity in the direction of the arrow V1, i.e. it has "hard" suspension characteristics, while it has a very low natural rigidity in the direction of arrow V2, and thus has a "soft" suspension characteristic.

The connecting element 5 can also be provided with a directional natural rigidity, but when the camera skeleton 1 is suspended in the camera housing 2, the use of a connecting element with high natural rigidity in the direction of the arrow V3 suffices, so that this connecting element 5 acts as a brace, by means of which the maintenance of the constant flange focal distance A is guaranteed.

On the other hand, the connecting element 6 located in the back side of the camera does not have a directional natural rigidity, but a soft suspension characteristic, which pushes the camera skeleton 1 with high pretension in the direction of the arrow K toward the front side of the camera housing 2, so that a precise maintenance of the flange focal distance A is guaranteed.

The connecting elements, schematically illustrated in FIG. 1 for a clearer understanding of the solution according to the invention, and their arrangement between the camera skeleton 1 and the camera housing 2 are explained in greater detail below, with reference to the accompanying figures.

Figure 2:
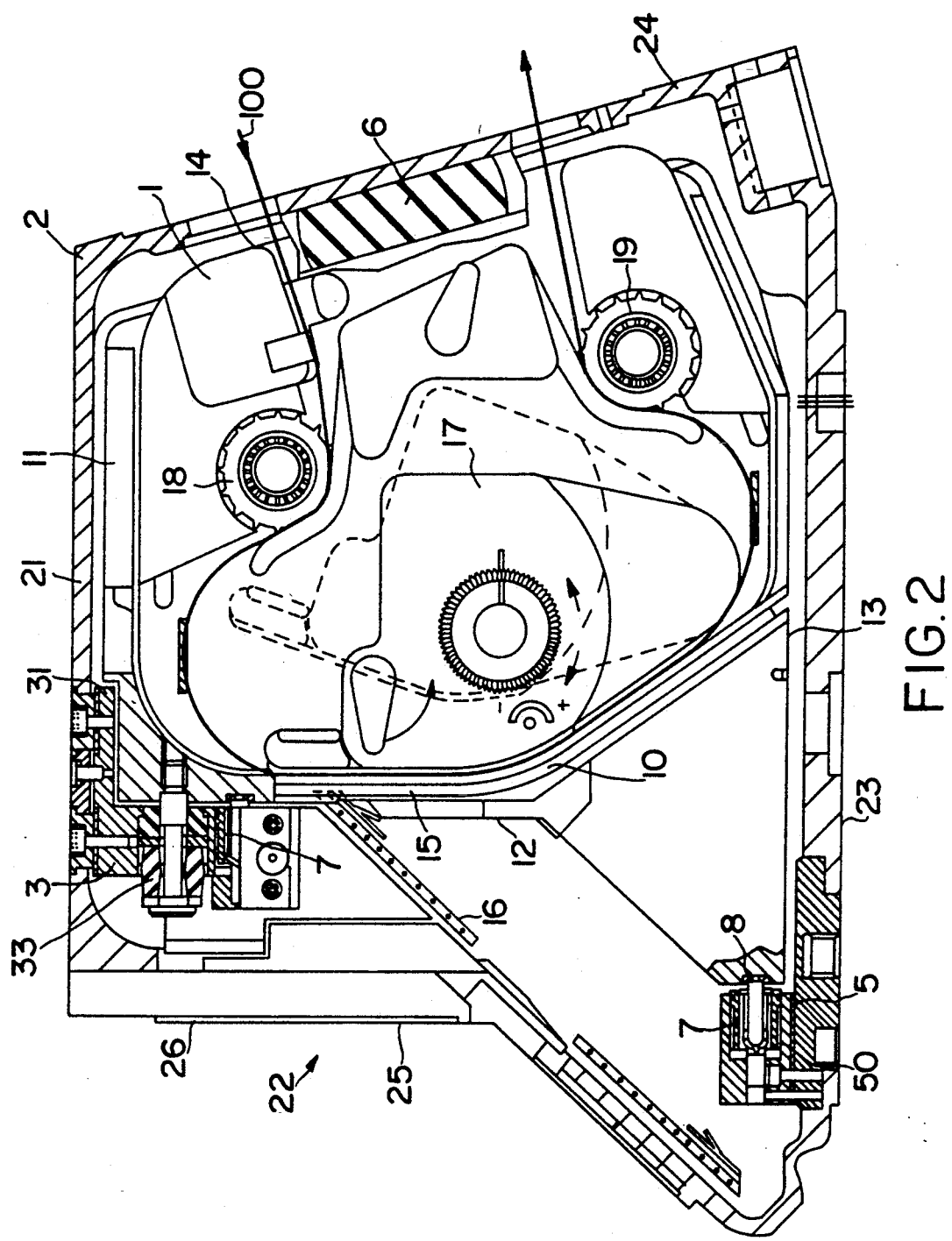
FIG. 2 longitudinal section through a moving picture camera with soundproofing connecting elements, which have directional and non-directional natural rigidities.
Figure 3:
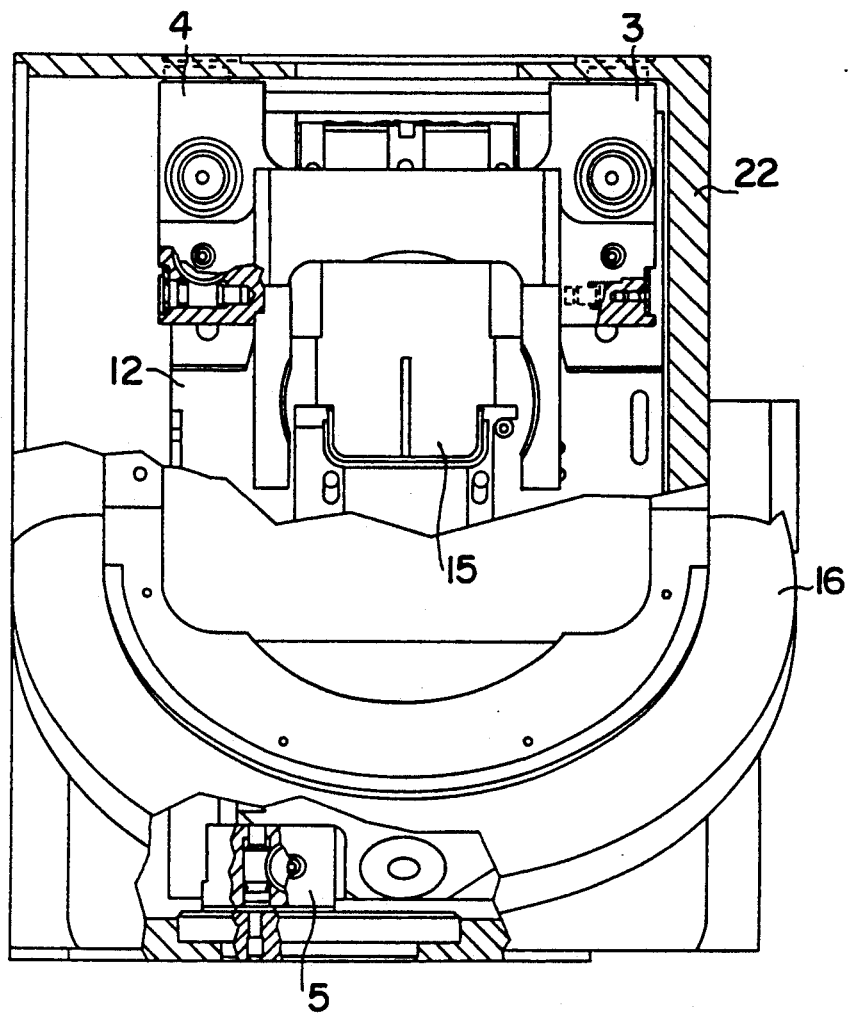
FIG. 3 shows a front view, in partial section, of the moving picture camera illustrated in FIG. 2.

FIG. 2 shows a longitudinal section and FIG. 3 a front view in partial section of a moving picture camera with a camera skeleton 1 and a camera housing 2, between which there are connecting elements 3, 5, 6, analogous to the schematic illustration in FIG. 1.

The camera skeleton 1 supports all the elements of a moving picture camera which move and thus generate noise and vibrations, plus a claw feed mechanism 17, feed and take-up toothed spools 18, 19 and a rotating reflecting diaphragm 16.

The camera housing 2 is equipped on its front side 22 with a lens mounting 26 which defines the lens plane 25. The moving picture film 100 is intermittently moved by means of the claw feed mechanism 17 along an image aperture 15 on the front side 12 of the camera skeleton 1, whereby the image aperture 15 defines the focal plane 10.

Between the upper side 21 of the camera housing 2 and the upper side 11 of the camera skeleton 1, there are connecting elements 3, 4 with directional natural rigidity on both sides of the image aperture 15. Oriented eccentrically to the axis of symmetry of the moving picture camera, there is a connecting element 5 for support in the direction of the flange focal distance between the bottom 23 of the camera housing 2 and the front side 12 of the camera skeleton 1.

Between the back side 24 of the camera housing 2 and the back side 14 of the camera skeleton 1, there is a connecting element 6 with soft suspension characteristics, without any directional natural rigidity, which pushes the camera skeleton 1 toward the front-side connecting elements 3, 4, 5. In the gap remaining between the upper side 21 of the camera housing 2 and the upper side 11 of the camera skeleton 1, the front side 22 of the camera housing 2 and the front side 12 of the camera skeleton 1, and between the bottom 23 of the camera housing 2 and the underside 13 of the camera skeleton 1 and the backside 24 of the camera housing 2 and the back side 14 of the camera skeleton 1, there are no additional connecting elements, so that here the transmission of air borne noise from the noise-producing elements on the camera skeleton 1 to the camera housing 2 is still possible.

If necessary, this air borne noise transmission can be largely suppressed by suitable measures for additional soundproofing, e.g. by the application of soundproofing coatings on the inner surface of the camera housing 2, etc.

The upper connecting elements 3 and 4 are thereby designed so that they guarantee a constant flange focal distance in the direction of the flange focal distance, i.e. between the lens plane 25 and the focal plane 15, and on the other hand guarantee a soft suspension action in the plane perpendicular to it. That is, lens plane 25 and focal plane 15 are at a constant distance from one another, but the focal plane 15 itself has a soft suspension allows it to move in the focal plane 15. This is made possible on one hand by the arrangement of rubber buffers 33 for the soft suspension, and on the other hand by a vibration damper 7 for correct orientation inside a bearing bush 31.

The lower connecting element 5, on the other hand, is intended to provide solid support toward the flange focal distance, and for this purpose it is composed of a vibration damper 7, which is located in a bearing housing 50. The bearing housing 50 is directly connected to the bottom 23 of the camera housing 2, whereby the connection is made by means of an insert in the bottom 23 of the camera housing 2.

The detailed construction of the connecting elements with soft and hard suspension, as well as of the vibration damper, is explained in greater detail below, with reference to the accompanying FIGS. 4 and 5.

As is clearly shown in FIGS. 2 and 3, the adjustment elements with directional natural rigidity are located on the front side of the camera so that no noise generated can be transmitted via the camera housing 2. For this purpose, locations in the camera housing 2 are selected which are insensitive in relation to the characteristic vibrations. These locations are corners or edges of the camera housing 2, whereby for the suspension of the camera skeleton 1 in the camera housing 2, the corner regions on both sides of the image aperture 15 have been selected, and for bracing the camera skeleton 1 in the camera housing 2 under the rotating reflecting diaphragm 16 has been selected, as shown in FIG. 3.

If, on the other hand, any other areas were selected, that would mean that the structurally borne noise would be transmitted to the front side 22 of the camera housing 2, which would cause characteristic oscillations of the front side 22, which would in turn be transmitted to the lens acting as an antenna, so that the structurally borne noise would be transmitted to the environment of the camera.

Figure 4:
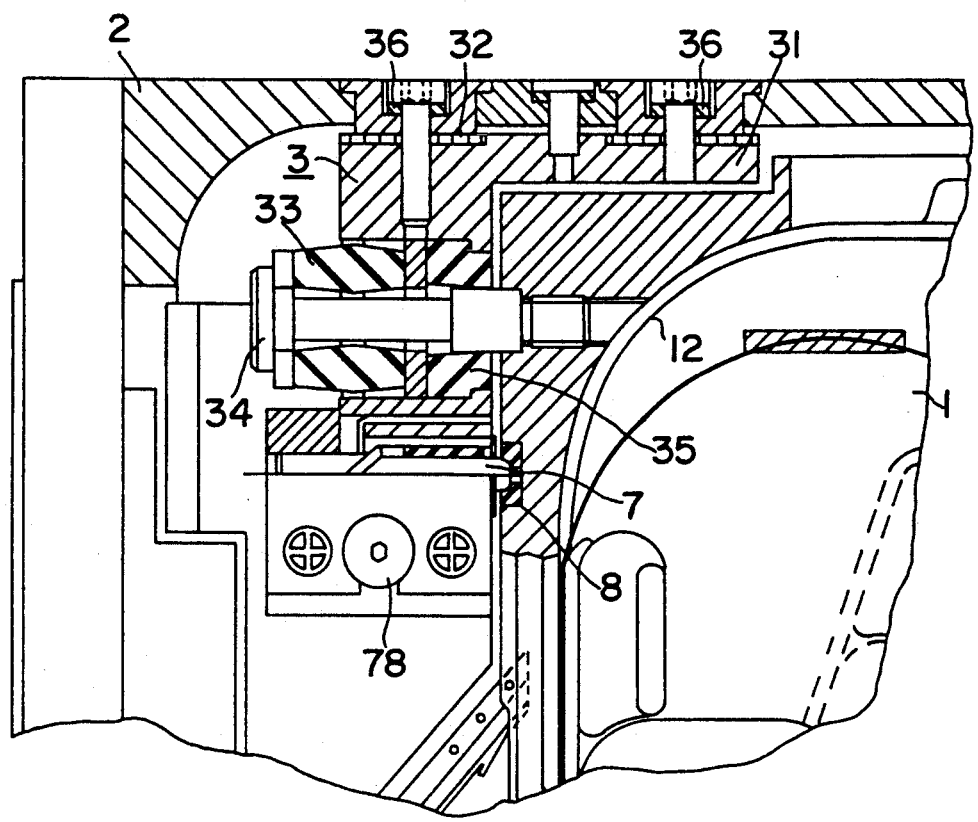
FIG. 4 shows a longitudinal section through a connecting element with directional natural rigidity.

FIG. 4 is an enlarged detail showing a connecting element with directional natural rigidity, as it is used in the present embodiment for the suspension of the camera skeleton 1 on the camera housing 2, on both sides of the image aperture 15 as shown in FIG. 3.

This connecting element with directional natural rigidity has a bearing housing 31, which is connected to the camera housing 2 by means of screw connections and Eladur discs 32 located between the bearing housing 31 and the inside of the camera housing 2. The Eladur discs 36, which are located under the screws for fastening the bearing housing 31, prevent a possible acoustical bridge to the camera housing 2. The bearing housing 31 has a hole running in the direction of the flange focal distance, into which a bearing bush 35 is inserted. The bearing bush illustrated in FIG. 6 can also be used as an alternative.

Also inserted in the hole in the bearing housing 31 is a rubber element 33, which is fastened by means of a screw 34 inserted through an inner hole in the rubber element 33. The screw 34 is screwed into an internally threaded piece in the front side 12 of the camera skeleton 1.

The rubber element 33 guarantees a soft suspension in the direction perpendicular to the flange focal distance. On the other hand, a vibration damper 7 provides high natural rigidity in the direction of the flange focal distance, and also provides temperature compensation, so that even in the event of severe temperature changes, no readjustment is necessary to maintain the specified flange focal distance.

For a rough and precise adjustment, the vibration damper 7 has corresponding adjustment devices, whereby the precision adjustment is achieved by means of a worm drive 78, which is accessible from the side, so that the necessary precision adjustments can always be made from the outside. The structural details of the vibration damper 7 are explained in greater detail below, with reference to the cross section illustrated in the accompanying FIG. 5.

Figure 5:
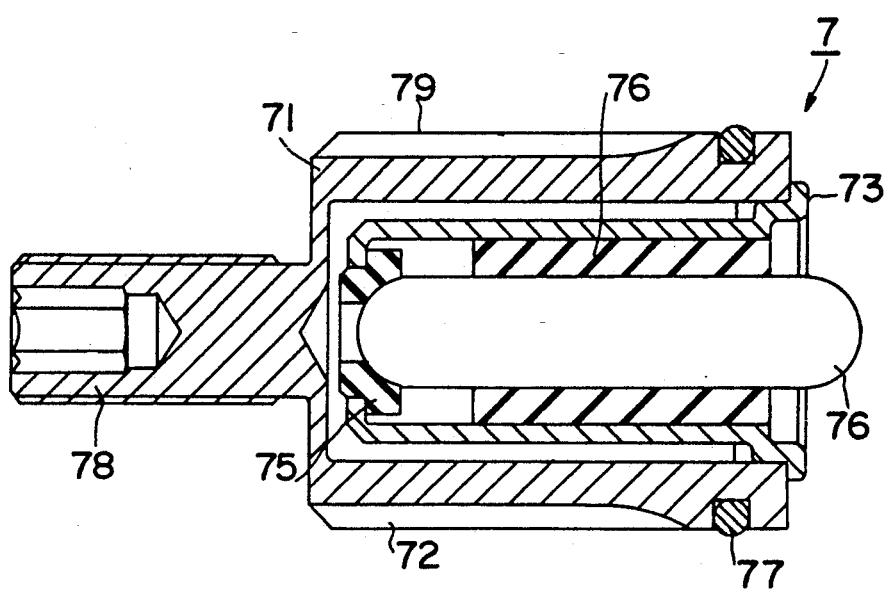
FIG. 5 shows a longitudinal section through a vibration damper.

FIG. 5 shows a longitudinal section through a vibration damper 7, as it is used both in connection with the connecting elements 3, 4 for the suspension of the camera skeleton 1 in the camera housing 2, and also for bracing the camera skeleton 1 on the bottom 23 of the camera housing 2 illustrated in FIG. 2. This vibration damper 7 consists of a damper rod 76, which is braced against a plexiglass sleeve 8 connected to the camera skeleton 1, as shown in the longitudinal section through a moving picture camera in FIG. 2.

A damper housing 71 is connected to the camera housing 2 by means of the bearing housing 31, when the vibration damper is located in a connecting element 3, 4, as shown in FIGS. 2 and 3, or directly by means of the bottom 23 of the camera housing 2.

The damper housing 71 consists of a pivot 78 for the rough adjustment of the vibration damper 7, a damper sleeve 79 to hold the damper rod 76, and an inner sleeve 73 located between the damper rod 76 and the inside of the damper sleeve 71. The inner sleeve 73 has a U-shaped longitudinal section and a radial shoulder on the one end surface, whereby the outside diameter of the inner sleeve is sized in relation to the inside diameter of the damper sleeve 79 so that a radial gap is formed. Only in the area of the inside sleeve shoulder is there a positive connection between the outer surface of the inner sleeve 73 and the inner surface or the end surface of the damper sleeve 79.

Between the bottom 73 of the inner sleeve 73 and the bottom of the damper sleeve 79, there is also an axial gap, whereby a plexiglass bearing ring 75 is inserted into the bottom of the inner sleeve 73 to support one end of the damper rod 76. The damper rod 76 is guided inside the inner sleeve 73 by means of an insulation sleeve 74, and with its other end is in contact with the plexiglass bush 8, as shown in FIG. 2.

For the precision adjustment of the vibration damper 7, there is a worm drive located on the outer surface of the damper sleeve 79, while a radially circular groove in the damper sleeve 79 in the vicinity of its end surface holds an O-ring 77, which forms a seal for the vibration damper 7 in the bearing housing 31 or 50. As a result of the surrounding of the damper rod 76 with an insulating sleeve 74 made of foam rubber, a vibration-damping mounting of the damper rod 76 in the radial direction is guaranteed, so that a "soft" suspension is guaranteed in the plane perpendicular to the direction of the flange focal distance, as shown in FIG. 2.

On the other hand, a high natural rigidity and thus a "hard" suspension is guaranteed in the direction perpendicular to the flange focal distance, whereby a thermal expansion compensation of the vibration damper takes place as a result of an appropriate material selection.

The material for the damper pin 76 and the damper housing 71 is steel with a small coefficient of thermal expansion, e.g. $1.2 \times 10-6$ mm/C.°, while the material for the inner sleeve preferably consists of aluminum or an aluminum-tin-magnesium-copper alloy with a coefficient of thermal expansion, for example, of $23 \times 10-6$ mm/C.°.

As a result of the different material characteristics of the damper housing 71 and of the damper rod 76 on the one hand, and of the inner sleeve 73 on the other hand, there is a compensation for the different thermal expansion of the individual components, so that by means of the vibration damper 7, a specified flange focal distance can be maintained between the front side 12 of the camera skeleton 1 and the front side 22 of the camera housing 2, and thus between the lens plane and the focal plane.

When the ambient temperature increases, there is only a negligible expansion of the damper housing 71, while there is a significant thermal expansion of the inner sleeve 73 on account of the significantly higher coefficient of thermal expansion. When this significantly greater thermal expansion occurs, the inner sleeve 73, on account of the positive connection between the inner sleeve 73 and the damper rod 76, pulls the damper rod 76 along with it, and thus compensates for the negligible expansion of the damper rod 76 and of the damper housing 71 in the opposite direction.

The worm gear 72, together with an adjustment apparatus 78 illustrated in FIG. 4 is used for the precision adjustment of the vibration damper 7, and thus of the distance between the focal plane and the lens plane. The adjustment apparatus 78 for the precision adjustment of the camera skeleton 1 in relation to the lens mount 26 is thereby arranged so that an adjustment can be performed easily when the camera housing is open.

Figure 6:
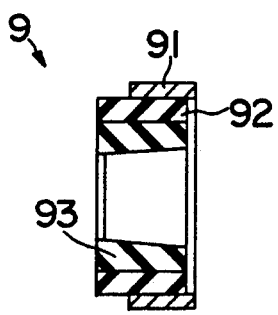
FIG. 6 shows a section through a bearing bush of a connecting element with directional natural rigidity.

FIG. 6 shows a cross section through a bearing for mounting the connecting elements with directional natural rigidity, which can be used in place of the Eladur bush 35 illustrated in FIG. 4.

This bush 9 illustrated in FIG. 6 consists of an external steel ring 91, in which there is a special rubber ring 92 with a hardness of preferably 60 Shore, which in turn encloses an inner ring 93 made of plexiglass. This bearing offers additional damping properties, so that the structurally borne noises and vibrations transmitted from the camera skeleton 1 to the connecting rod 34 shown in FIG. 4 can be sufficiently damped even in the bearing.

One aspect of the invention resides broadly in an apparatus for the soundproofing of moving picture cameras with a soundproofing mounting of the camera skeleton supporting the parts of the camera mechanism which generate noise, in a camera housing which has a lens mount, to which interchangeable lenses can be fastened, whereby for the soundproof mounting of the camera skeleton in the camera housing there is a plurality of soundproofing connecting elements between the camera skeleton and the camera housing, characterized by the fact that at least some 3, 4, 5 of the soundproofing connecting elements 3, 4, 5, 6 have a directional natural rigidity.

Another aspect of the invention is an apparatus characterized by the fact that the connecting elements 3, 4, 5 having a directional natural rigidity have a high, fixed and temperature-compensated rigidity in the direction of the flange focal distance A between the lens plane 25 of the camera housing 2 and the focal plane 15 of the camera skeleton 1, as well as a low rigidity in the plane perpendicular to it.

Yet another aspect of the invention is an apparatus characterized by the fact that the connecting elements 3, 4, 5 having a high directional rigidity are located between the front side 12 of the camera skeleton 1 and the front side 22 of the camera housing 2, and that there is at least one additional connecting element 6 between the back side 14 of the camera skeleton 1 and the back side 24 of the camera housing 2, which with high elasticity exerts a high initial tension between the camera skeleton 1 and the camera housing 2.

A further aspect of the invention is an apparatus characterized by the fact that the front-side connecting elements 3, 4, 5 are fastened on one hand to the upper or lower side 21/23 of the camera housing 2, and on the other hand to the front plate 12 of the camera skeleton 1, and exert a specified, high rigidity in the direction of the front plate 12 of the camera skeleton 1.

A yet further aspect of the invention is an apparatus characterized by the fact that the camera skeleton 1 is suspended on two front-side connecting elements 3, 4 which are located on either side of the image aperture 10 or of the lens mount 26, while a third, front-side connecting element 5 is located below the reflecting diaphragm 16 of the moving picture camera.

Yet another further aspect of the invention is an apparatus characterized by the fact that the connecting elements 3, 4, 5 having a directional natural rigidity are suspended at points of the camera housing 2 which have a high structural rigidity, in particular in the vicinity of corners or edges of the camera housing 2.

An additional aspect of the invention is an apparatus characterized by the fact that the connecting elements 3, 4, 5 having a directional natural rigidity contain a vibration damper 7, which have an essentially hollow cylindrical damper housing 71, an inner sleeve 73 mounted in the damper housing 71, and a soundproofing damper rod 76 in contact with one end surface of the inner sleeve 73 and by means of an insulation sleeve 74 against the cylinder wall of the inner sleeve 73, which is braced by means of a bearing ring 75 preferably made of plexiglass against the end surface of the inner sleeve 73 and by means of the foam rubber insulation sleeve 74 against the cylinder wall of the inner sleeve 73.

A yet additional aspect of the invention is an apparatus characterized by the fact that the inner sleeve 73 is made of aluminum and is braced against the end surface of the steel damper housing 71 facing the camera skeleton 1, that the damper pin 76 is made of steel and is braced on one end against the end surface of the inner sleeve facing the bottom of the damper housing 71, and on its other end is braced against a bearing 8 connected to the camera skeleton 1.

A further additional aspect of the invention is an apparatus characterized by the fact that the damper housing 71 has a worm drive which, in connection with a worm gear, makes possible the precision adjustment of the camera skeleton 1 in relation to the lens mount 25, and has a pivot-shaped part 78 for rough adjustments.

A yet further additional aspect of the invention is an apparatus characterized by the fact that the connecting elements 3, 4, 5 having a directional natural rigidity have a bearing housing 31 connected to the camera housing 1 and containing cylindrical holes which are oriented toward the front side 12 of the camera skeleton 1 and are used to hold buffer elements 33 and vibration dampers 7, whereby the buffer elements 33, 34, 35; 9 consist of hollow cylinder rubber buffers 33, which are connected to the front side 12 of the camera skeleton 1 by means of a screw element 34 inserted through the inner hole of the rubber buffer 33 and a bearing bush 35; 9 which consists of an external steel ring, a special rubber ring 92 located in it and a plexiglass ring 93 inside the special rubber ring 32.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The appended drawings in their entirety, including all dimensions, proportions and/or shapes in at least one embodiment of the invention, are accurate and to scale and are hereby incorporated by reference into this specification.

The invention as described hereinabove in the context of the preferred embodiments is not to be taken as limited to all of the provided details thereof, since modifications and variations thereof may be made without departing from the spirit and scope of the invention.

What is claimed is:

1. An apparatus for the soundproofing of a motion picture camera, comprising:
    a camera housing, said camera housing having a front side and a back side opposite said front side, and an upper and lower side;
    a lens mounting for mounting a lens on said front side of said camera housing, said lens mounting being attached to said camera housing;
    a camera skeleton for supporting moving mechanical parts of the camera mechanism which generate sound and mechanical vibration;
    first and second mounting elements for mounting said camera skeleton in said housing;
    said first mounting elements being configured to have a high, fixed and temperature-compensation rigidity in the direction of the focal distance between the lens plane of the camera housing and the focal plane of the camera skeleton, and also being configured to have a low rigidity in the plane perpendicular to it;
    said high rigidity being greater than said lower rigidity;
    said second mounting elements being configured to have a substantial elasticity for exerting a substantial initial tension between the camera skeleton and the camera housing;
    said first mounting elements being located between the front side of the camera skeleton and the front side of the camera housing;
    said second mounting elements being located between the back side of the camera skeleton and the back side of the camera housing.

2. An apparatus according to claim 1 wherein said first mounting elements are fastened on one hand to the upper and lower side of the camera housing, and on the other hand to the front plate of the camera skeleton.

3. An apparatus according to claim 2 wherein the camera skeleton is suspended on two front-side first mounting elements which are located on either side of one of the image aperture and of the lens mount, while a third, front-side first mounting element is located below the reflecting diaphragm of the moving picture camera.

4. An apparatus according to claim 2 wherein said first mounting elements are suspended at points of the camera housing which have a high structural rigidity, in the vicinity of one of the corners and edges of the camera housing.

5. An apparatus according to claim 1 wherein said first mounting elements contain a vibration damper, which have an essentially hollow cylindrical damper housing, an inner sleeve mounted in the damper housing, and a soundproofing damper rod in contact with one end surface of said inner sleeve and by means of an insulation sleeve against the cylinder wall of said inner sleeve, which is braced by means of a bearing ring against the end surface of said inner sleeve and by means of said insulation sleeve against the cylinder wall of said inner sleeve.

6. An apparatus according to claim 5 wherein said inner sleeve is made of aluminum and is braced against the end surface of said damper housing facing the camera skeleton, a damper pin being made of steel and being braced on one end against the end surface of said inner sleeve facing the bottom of said damper housing, and on its other end being braced against a bearing connected to the camera skeleton.

7. An apparatus according to claim 6 wherein said damper housing is provided with a worm drive which, in connection with a worm gear is arranged for a precise adjustment of said camera skeleton in relation to said lens mount, and has a pivot-shaped part for rough adjustments.

8. An apparatus according to claim 1 wherein said first mounting elements have a bearing housing connected to said camera housing and containing cylindrical holes which are oriented toward the front side of the camera skeleton and are used to hold buffer elements and vibration dampers, wherein the buffer elements comprise of hollow cylinder rubber buffers, which are connected to the front side of the camera skeleton by means of a screw element inserted through the inner hole of the rubber buffer and a bearing bush which comprises an external steel ring, a rubber ring located in it and a plexiglass ring located inside the rubber ring.

* * * * *